US008018985B2

(12) United States Patent
Khayrallah et al.

(10) Patent No.: US 8,018,985 B2
(45) Date of Patent: Sep. 13, 2011

(54) CDMA RECEIVERS FOR THE GOLDEN CODE

(75) Inventors: Ali S. Khayrallah, Cary, NC (US); Yi-Pin Eric Wang, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 775 days.

(21) Appl. No.: 12/056,035

(22) Filed: Mar. 26, 2008

(65) Prior Publication Data

US 2009/0245330 A1 Oct. 1, 2009

(51) Int. Cl.
*H04B 1/00* (2006.01)

(52) U.S. Cl. ........ 375/148; 375/147; 375/130; 375/140; 375/316; 375/259; 375/260; 455/42; 455/43; 455/44; 455/45; 370/203; 370/208; 370/209

(58) Field of Classification Search .............. 375/259, 375/148, 147, 130, 140, 316, 260; 455/42, 455/43, 44, 45; 370/203, 208, 209
See application file for complete search history.

(56) References Cited

U.S. PATENT DOCUMENTS

| 7,680,204 | B2 * | 3/2010 | Champion | 375/267 |
|---|---|---|---|---|
| 2003/0092447 | A1 * | 5/2003 | Bottomley et al. | 455/453 |
| 2004/0153679 | A1 * | 8/2004 | Fitton et al. | 713/322 |
| 2005/0201447 | A1 | 9/2005 | Cairns et al. | |
| 2006/0029124 | A1 * | 2/2006 | Grant et al. | 375/148 |
| 2006/0256843 | A1 * | 11/2006 | Grant et al. | 375/148 |
| 2006/0274848 | A1 * | 12/2006 | Champion | 375/267 |
| 2007/0147481 | A1 * | 6/2007 | Bottomley et al. | 375/148 |
| 2009/0202015 | A1 * | 8/2009 | Kwon et al. | 375/267 |
| 2010/0008404 | A1 * | 1/2010 | Abou Rjeily | 375/141 |
| 2010/0020896 | A1 * | 1/2010 | Willems et al. | 375/295 |
| 2010/0034320 | A1 * | 2/2010 | Champion | 375/340 |

FOREIGN PATENT DOCUMENTS

| FR | WO2007/132084 | * 11/2007 |
|---|---|---|
| WO | 2007/132084 A1 | 11/2007 |

OTHER PUBLICATIONS

Belfiore, J.-C. et al. "The Golden Code: A 2 X 2 Full-Rate Space-Time Code With Nonvanishing Determinants." IEEE Transactions on Information Theory, vol. 51, No. 4, Apr. 2005, pp. 1432-1436.
Cerato, B. et al. "A VLSI Decoder for the Golden Code." 13th IEEE International Conference on Electronics, Circuits and Systems, 2006 (ICECS '06). Dec. 10-13, 2006, pp. 549-552.

(Continued)

*Primary Examiner* — Kenneth Lam
(74) *Attorney, Agent, or Firm* — Coats & Bennett, PLLC

(57) ABSTRACT

A Generalized Rake (G-Rake) receiver is adapted for Golden code reception in a CDMA system. Signals transmitted by two or more transmit antennas are received at two or more receiver antennas. The signal from each receiver antenna is despread, and channel estimation is performed for each transmit antenna. G-Rake combining weights are calculated based on impairment correlation across G-Rake fingers and channel coefficients corresponding to each transmit antenna. The despread values from each symbol period are combined over a plurality of symbol periods based on the combining weights. The combined values are processed using coefficients derived from the Golden number to generate a set of decision variables, and the Golden encoded symbols are jointly detected from the decision variables. In some embodiments, spherical decoding and triangularization significantly simplify the decoding problem formulation.

12 Claims, 2 Drawing Sheets

OTHER PUBLICATIONS

Dayal, P. et al. "An Optimal Two Transmit Antenna Space-Time Code and its Stacked Extensions." IEEE Transactions on Information Theory, vol. 51, No. 12, Dec. 2005, pp. 4348-4355.

Bottomley, G. E. et al. "A Generalized RAKE Receiver for Interference Suppression." IEEE Journal on Selected Areas in Communications, vol. 18, No. 8, Aug. 2000, pp. 1536-1545.

Yao, H. et al. "Structured Space-Time Block Codes With Optimal Diversity-Multiplexing Tradeoff and Minimum Delay." IEEE Global Telecommunications Conference, 2003 (GLOBECOM '03). Dec. 1-5, 2003, vol. 4, pp. 1941-1945.

Zheng, L. et al. "Diversity and Multiplexing: A Fundamental Tradeoff in Multiple-Antenna Channels." IEEE Transactions on Information Theory, vol. 49, No. 5, May 2003, pp. 1073-1096.

Wang, Y-P. E. et al. "Transmit Diversity and Receiver Performance in a WCDMA System." IEEE Global Telecommunications Conference, 2007 (GLOBECOM '07). Nov. 26-30, 2007, pp. 4205-4209.

* cited by examiner

CDMA RECEIVERS FOR THE GOLDEN CODE

BACKGROUND

The Golden ratio, in which the ratio between the sum of two quantities and the larger one is the same as the ratio between the larger and smaller one, or $$\frac{a+b}{a} = \frac{a}{b},$$

has been known in mathematics and the arts since at least ancient Greece. The unique positive solution to this ratio is an algebraic irrational number known as the Golden number, $$\theta = \frac{1+\sqrt{5}}{2}$$

(approximately 1.6180339887498948482 . . . ).

A digital encoding scheme for a 2 by 2 Multiple Input, Multiple Output (MIMO) antenna system, utilizing the Golden number and accordingly referred to as the Golden code, is described in papers by J. C. Belfiore, G. Rekaya, and E. Viterbo, "The golden code: A 2×2 full-rate space-time code with nonvanishing determinants," published in the *IEEE Trans. Inf. Theory*, vol. 51, no. 4, pp. 1432-1436, April 2005, and P. Dayal and M. K. Varanasi, "An optimal two transmit antenna space-time code and its stacked extensions," published in the *IEEE Trans. Inf. Theory*, vol. 51, no. 12, pp. 4348-4355, December 2005, both of which are incorporated herein by reference in their entirety.

The Golden code is a space-time code for 2×2 MIMO that is full-rate and full-diversity. It has many properties of interest in the field of wireless communications. For example, it had been shown that the Golden code achieves the optimal tradeoff between diversity gain and multiplexing gain in a slow-fading channel, as described in papers by H. Yao and G. W. Wornell, "Structured space-time block codes with optimal diversity-multiplexing tradeoff and minimum delay," published in *Proc. IEEE Globecom* 2003, and by L. Zheng and D. N. C. Tse, "Diversity and multiplexing: A fundamental tradeoff in multiple antenna channels," published in *IEEE Trans. Inf. Theory*, vol. 49, no. 5, pp. 1073-1096, May 2003, both of which are incorporated herein by reference in their entirety. It has also been shown that the Golden code achieves the best possible coding gain for QAM and PAM types of modulation, by Dayal and Varanasi, supra. Because the Golden code does not suffer the loss of spectral efficiency with the increase of the signal constellation, as do other codes, it can be used with higher order modulations, and is thus a good choice in systems with adaptive selection of the modulation scheme. Due to its superiority in these key performance metrics, the Golden code has been included in, e.g., the IEEE 802.11 and 802.16 specifications. Furthermore, the Golden code has been generalized to other MIMO configurations such as 3×3, 4×4, and 6×6, as described in the paper by F. Oggier, G. Rekaya, J.-C. Belfiore, and E. Viterbo, "Perfect space-time block codes," published in *IEEE Trans. Inf. Theory*, vol. 52, no. 9, pp. 3885-3902, September 2006, incorporated herein by reference in its entirety.

For a 2×2 MIMO configuration, let $s_1$, $s_2$, $s_3$, and $s_4$ be four data symbols. The Golden code encodes these four symbols according to $$X = \begin{bmatrix} x_{1,1} & x_{1,2} \\ x_{2,1} & x_{2,2} \end{bmatrix}$$

$$= \frac{1}{\sqrt{5}} \begin{bmatrix} (1+i\theta)s_1 + (\theta-i)s_2 & (1+i\theta)s_3 + (\theta-i)s_4 \\ (i-\theta)s_3 + (1+i\bar{\theta})s_4 & (1+i\theta)s_1 + (\bar{\theta}-i)s_2 \end{bmatrix},$$

where $i=\sqrt{-1}$, and $\bar{\theta}=1-\theta$.

The coded symbol $x_{i,j}$ is transmitted from antenna i during the jth symbol interval.

Receivers for the Golden code are known in non-spread systems such as OFDM or TDMA in the presence of additive white Gaussian noise (AWGN). Typically, sphere decoding is used to recover the original symbols based on a reduced-complexity approximation to the maximum-likelihood (ML) decoder, as disclosed in the paper by B. Cerato, G. Masera, and E. Viterbo, "A VLSI decoder for the Golden code," published in *Proc. IEEE ICECS*, pp. 549-553, December 2006, incorporated herein by reference in its entirety.

In spread spectrum systems such as CDMA, the Generalized Rake (G-Rake) receiver is effective in suppressing colored interference, as described in the paper by G. E. Bottomley, T. Ottosson, and Y. P. E. Wang, "A generalized RAKE receiver for interference suppression," published in *IEEE J. Sel. Areas Commun.*, vol. 18, no. 8, pp. 1536-1545, August 2000, incorporated herein by reference in its entirety. In a CDMA system, multipaths result in loss of signal orthogonality and increased self-interference. In this scenario, G-Rake can significantly improve performance by equalizing the channel. Typically, interference in a CDMA system can be modeled as a colored noise when there are few dominant interfering sources. G-Rake suppresses interference by accounting for interference temporal and spatial correlations in its combining weight formulation.

The G-Rake receiver was extended to deal with transmit diversity signals, such as the Alamouti encoded signal, as described in the paper by Y. P. E. Wang, G. E. Bottomley, and A. S. Khayrallah, "Transmit diversity and receiver performance in a WCDMA system," published in the proceedings of IEEE Globecom 2007, Washington, D.C., USA, Nov. 26-30, 2007, incorporated herein by reference in its entirety. It was shown that the G-Rake combining weights derived based on channel coefficients with respect to a $1^{st}$ transmit antenna and a $2^{nd}$ transmit antenna, respectively, are used to combine the despread values from two symbol intervals. The G-Rake combined values are then used to formulate the decision variables. The transmitted symbols can then be individually detected based on the decision variables.

There exists a need in the art for a CDMA receiver solution for detecting the Golden encoded signal in a CDMA system, in the presence of colored noise.

SUMMARY

According to one or more embodiments of the present invention, a G-Rake receiver is adapted for Golden code reception in a CDMA system. Signals transmitted by two or more transmit antennas are received at two or more receiver antennas. The signal from each receiver antenna is despread, and channel estimation is performed for each transmit antenna. G-Rake combining weights are calculated based on impairment correlation across G-Rake fingers and channel coefficients corresponding to each transmit antenna. The despread values from each symbol period are combined over a plurality of symbol periods based on the combining weights. The combined values are processed using coefficients derived from the Golden number to generate a set of decision variables, and the Golden encoded symbols are jointly detected from the decision variables. In some embodiments, spherical decoding and triangularization significantly simplify the decoding problem formulation.

DETAILED DESCRIPTION

Figure 1:
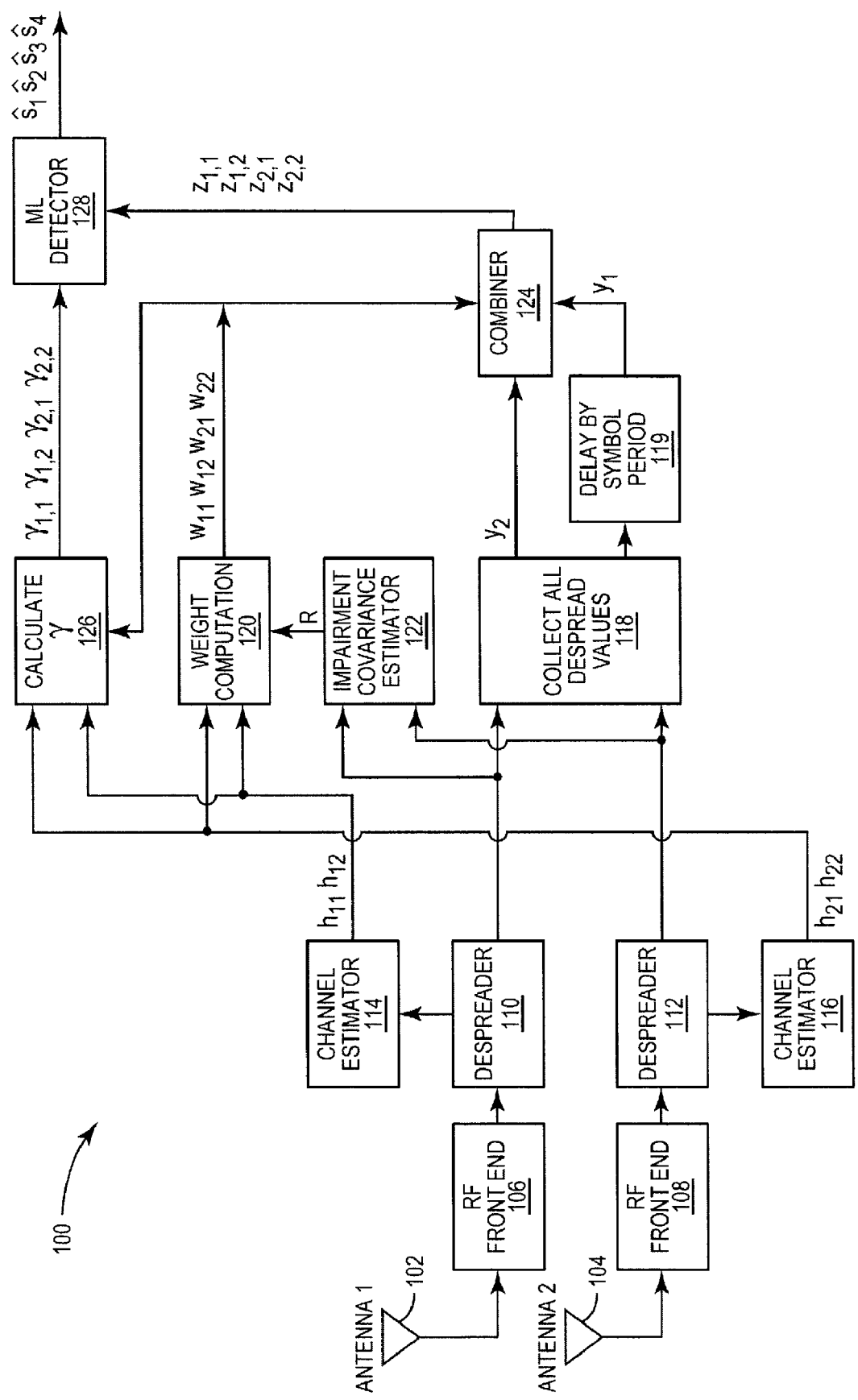
FIG. 1 is a functional block diagram of a CDMA Golden code receiver.

A 2×2 MIMO signal received in a CDMA system can be expressed as $$Y = HX + U,$$

where $$Y = \begin{bmatrix} y_{1,1} & y_{1,2} \\ y_{2,1} & y_{2,2} \end{bmatrix},$$

$$H = \begin{bmatrix} h_{1,1} & h_{1,2} \\ h_{2,1} & h_{2,2} \end{bmatrix},$$

$$U = \begin{bmatrix} u_{1,1} & u_{1,2} \\ u_{2,1} & u_{2,2} \end{bmatrix},$$

$y_{i,j}$ is a vector of the despread values collected from the ith receive antenna during jth symbol period, $y_{i,j} = (y_{i,j}(1), y_{i,j}(2), \ldots, y_{i,j}(J-1))^T$,
$h_{i,j}$ is the net response between the jth transmit antenna and the ith receive antenna, and
$u_{i,j}$ is impairment in $y_{i,j}$.

Converting matrix Y into a vector, i.e., $y = (y_{1,1}^T, y_{2,1}^T, y_{1,2}^T, y_{2,2}^T)^T$, then $$y = H'x + u,$$

where $$H' = \begin{bmatrix} H & 0 \\ 0 & H \end{bmatrix},$$

$x = (x_{1,1}, x_{2,1}, x_{1,2}, x_{2,2})^T$, and
$u = (u_{1,1}^T, u_{2,1}^T, u_{1,2}^T, u_{2,2}^T)^T$.

The Golden encoded symbols x can be related to the original data symbol $s = (s_1, s_2, s_3, s_4)^T$ through $x = Gs$, where $$G = \frac{1}{\sqrt{5}} \begin{bmatrix} 1+i\bar{\theta} & \theta-i & 0 & 0 \\ 0 & 0 & i-\theta & 1+i\bar{\theta} \\ 0 & 0 & 1+i\theta & \bar{\theta}-i \\ 1+i\theta & \bar{\theta}-i & 0 & 0 \end{bmatrix}$$

for this version of the Golden code. Different versions of the Golden code do not change the properties of the inventive receiver, but rather would alter the definition of G above.

Define $A = H'G$, and $A_1$ and $A_2$ as the upper part and lower part of A, respectively, $$A_1 = [(1+i\bar{\theta})h_1 \quad (\theta-i)h_1 \quad (i-\theta)h_2 \quad (1+i\bar{\theta})h_2]$$

$$A_2 = [(1+i\theta)h_2 \quad (\bar{\theta}-i)h_2 \quad (1+i\theta)h_1 \quad (\theta-i)h_1],$$

where $h_j = (h_{1,j}^T, h_{2,j}^T)^T$.

The likelihood function of s given despread values y is therefore $$LL(s) = -(y - As)^H R_u^{-1} (y - As),$$

where $R_u$ is the covariance of u. The covariance can be obtained by averaging the outer product of u over a time duration that the net responses are approximately constant, $R_u = E[uu^H]$. In the process of time averaging, the pseudo-random spreading codes are also averaged out, resulting in $$R_u = \begin{bmatrix} R & 0 \\ 0 & R \end{bmatrix},$$

where the impairment covariance matrix $R = E[u_1 u_1^H] = E[u_2^H]$, $u_j = (u_{1,j}^T, u_{2,j}^T)^T$. Note that R is the matrix of impairment correlations across G-Rake receiver fingers.

Using the diagonal property of $R_u$, the log-likelihood function reduces to $$LL(s) = -(y_1 - A_1 s)^H R^{-1}(y_1 - A_1 s) - (y_2 - A_2 s)^H R^{-1}(y_2 - A_2 s),$$

where $y_j = (y_{1,j}^T, y_{2,j}^T)^T$ is a vector of the despread values obtained in the jth symbol interval.

Discarding quantities independent of the symbol hypothesis (and taking slight liberties with notation), the log-likelihood function further reduces to $$LL(s) = 2Re\{s^H(A_1^H R^{-1} y_1 + A_2^H R^{-1} y_2)\} - s^H(D_1 + D_2)s \quad (1)$$

where $D_j = A_j^H R^{-1} A_j$. The last term on the right-hand side of (1) involves the whole vector s, and cannot be parsed into independent lower dimensional terms (as we will do with $y_1$ and $y_2$) when $D_1$ and $D_2$ are not diagonal matrices. Thus, LL(s) itself can not be parsed into independent terms. Instead, the search for the best candidate must be done over all 4 symbols, $s_1$, $s_2$, $s_3$, and $s_4$, simultaneously. For large constellations, the receiver complexity can be large. As discussed more fully herein, an adaptation of the sphere decoder will reduce the complexity of the receiver.

Expanding the terms in the log-likelihood function $$LL(s) = 2Re\left\{\frac{s_1^*}{\sqrt{5}}[(1+i\bar{\theta})^* z_{1,1} + (1+i\theta)^* z_{2,2}]\right\} + \quad (2)$$

$$2Re\left\{\frac{s_2^*}{\sqrt{5}}[(\theta-i)^* z_{1,1} + (\bar{\theta}-i)^* z_{2,2}]\right\} +$$

$$2Re\left\{\frac{s_3^*}{\sqrt{5}}[(i-\theta)^* z_{2,1} + (1+i\bar{\theta})^* z_{1,2}]\right\} +$$

$$2Re\left\{\frac{s_4^*}{\sqrt{5}}[(1+i\theta)^* z_{2,1} + (\theta-i)^* z_{1,2}]\right\} -$$

$$\sum_{m=1}^{4} |s_m|^2 d_{m,m} - \sum_{m=1}^{4} \sum_{n=1}^{4} 2Re\{s_m^* s_n d_{m,n}\}$$

where $w_j = R^{-1} h_j$, $h_j = (h_{1,j}^T, h_{2,j}^T)^T$,
$x^*$ stands for the complex conjugate of x and $$z_{j,k} = w_j^H y_k$$

$$d_{1,1} = d_{3,3} = \frac{1}{\sqrt{5}}[-\bar{\theta}\gamma_{1,1} + \theta\gamma_{2,2}]$$

$$d_{2,2} = d_{4,4} = \frac{1}{\sqrt{5}}[\theta\gamma_{1,1} - \bar{\theta}\gamma_{2,2}]$$

$$d_{1,2} = d_{3,4} = \frac{1}{\sqrt{5}}[\gamma_{1,1} - \gamma_{2,2}]$$

$$d_{2,4} = -d_{1,3} = \frac{1}{\sqrt{5}}[\gamma_{1,2} + i\gamma_{2,1}]$$

$$d_{1,4} = \frac{1}{\sqrt{5}}[-\bar{\theta}\gamma_{1,2} - i\theta\gamma_{2,1}]$$

$$d_{2,3} = \frac{1}{\sqrt{5}}[-\theta\gamma_{1,2} - i\bar{\theta}\gamma_{2,1}]$$

$$\gamma_{j,k} = h_j^H R^{-1} h_k = w_j^H h_k.$$

Thus, the receiver operation according to the present invention includes the steps of
(i) despreading the receiver signal to produce despread values in a first symbol period and also in a second symbol period;
(ii) formulating combining weights based on impairment correlation across fingers and channel coefficients corresponding to a first transmit antenna and a second transmit antenna;
(iii) producing a first set of combined values using the combining weights determined by impairment correlation and channel coefficients corresponding to the said $1^{st}$ transmit antenna to combine the despread values from the said $1^{st}$ symbol period to produce a 1st combined value and to combine the despread values from the said 2nd symbol period to produce a 2nd combined value;
(iv) producing a second set of combined values using the combining weights determined by impairment correlation and channel coefficients corresponding to the said 2nd transmit antenna to combine the despread values from the said $1^{st}$ symbol period to produce a 1st combined value and to combine the despread values from the said 2nd symbol period to produce a 2nd combined value;
(v) processing the multiple sets of combined values using coefficients derived from the Golden number to generate a set of decision variables; and
(vi) jointly detecting the transmitted symbols using the set of decision variables.

FIG. 1 depicts a functional block diagram of an exemplary 2×2 MIMO Golden code CDMA receiver 100. Signals are received at two receive antennas 102, 104, and are processed by RF front end processors 106, 108 to generate baseband receive samples. Despreader units 110, 112 despread the received baseband signals. Each despreader unit 110, 112 consists of multiple Rake fingers whose finger delays are determined based on a finger placement controller (not shown). The despread values (i.e., the Rake finger outputs) associated with the data channels from the two received signals during one symbol interval are then collected into a vector (vector $y_j$ in the derivations) at collection module 118.

Meanwhile, the despread values associated with the pilot channel (or pilot symbols) are provided to channel estimators 114, 116 to produce estimated net responses $h_{1,1}, h_{2,1}, h_{1,2}, h_{2,2}$, which forms vectors $h_1$ and $h_2$ in the derivations, $h_j = (h_{1,j}^T, h_{2,j}^T)^T$. G-Rake combining weights are calculated in weight computation module 120 based on the estimated net responses and an estimated impairment covariance matrix obtained at covariance estimator 122 from the vectors of despread values associated with the pilot channel. In other embodiments, the estimated covariance matrix may be replaced by an estimated receive sample correlations or despread value correlations.

The combining weights are used by combiner 124 to combine the despread values obtained over two symbol intervals (delaying data vectors in delay module 119) to produce G-Rake-combined data values $z_{1,1}, z_{2,1}, z_{1,1}$, and $z_{2,2}$. In addition, the combining weights are used in channel calculation module 126 to combine the net responses $h_1$ and $h_2$ to obtain G-Rake-combined channel values $\gamma_{1,1}, \gamma_{2,1}, \gamma_{1,2}$, and $\gamma_{2,2}$. Both $z_{1,1}, z_{2,1}, z_{1,2}, z_{2,2}$, and $\gamma_{1,1}, \gamma_{2,1}, \gamma_{1,2}, \gamma_{2,2}$ are used in the ML detector 128 to produce an estimate of the data symbols $s_1, s_2, s_3$, and $s_4$ according to equation (2).

Recall from equation (1) that the search for the best s requires a joint search for the symbols $s_1, s_2, s_3$, and $s_4$. If the symbols $s_1, s_2, s_3$, and $s_4$ belong to regular constellation such as QAM, then s belongs to a lattice structure. Sphere decoding is a well-known technique for searching a lattice in a greedy manner. By limiting the search to a subset of most likely candidates, the complexity is significantly reduced, with very little loss in performance. Sphere decoding can directly apply to (1). An even more efficient search algorithm can be developed based on a triangularization technique.

Recall the system equations defined earlier for the despread values at symbol intervals 1 & 2

$$y_1 = A_1 s + u_1$$

$$y_2 = A_2 s + u_2$$

Also, recall that noise $u_1$ and $u_2$ both have covariance R. Thus, the first step is to whiten the noise in $y_1$ and $y_2$. This allows the ML metric in (1) to be computed based on Euclidean distance. This whitening step also makes it easy to perform triangularization on the system equations via QR decomposition.

To whiten the noise, we compute the inverse of the square root of R, denoted $R^{-1/2}$. Applying the whitening filter to the original despread values, we get $$y'_1 = R^{-1/2} y_1 = A'_1 s + u'_1$$

$$y'_2 = R^{-1/2} y_2 = A'_2 s + u'_2,$$

where $A'_j = R^{-1/2} A_j$ and $u'_j = R^{-1/2} u_j$.

The noise $u'_j$ is now white across fingers. The squared Euclidean distance between the received signal and a hypothesized signal becomes the ML metric $$d_E^2(s) = |y'_1 - A'_1 s|^2 + |y'_2 - A'_2 s|^2.$$

Similar to the technique described by Cerato, et al., supra, we can perform QR decompositions on $A'_j$:

$$A'_j = Q_j U_j.$$

Here $Q_j$ is a unitary matrix and $U_j$ is an upper triangular matrix. Left multiplying $y'_j$ by $Q_j^H$ gives rise to $$\tilde{y}_1 = Q_1^H y'_1 = U_1 s + \tilde{u}_1$$

$$\tilde{y}_2 = Q_2^H y'_2 = U_2 s + \tilde{u}_2.$$

The squared Euclidean distance between the received signal and a hypothesized signal becomes $$d_E^2(s) = |\tilde{y}_1 - U_1 s|^2 |\tilde{y}_2 - U_2 s|^2.$$

Because $U_j$ is upper triangular, the squared Euclidean distance can be expressed as a sum of partial squared Euclidean distances, each of which depends on a subset of the hypothesized symbol values.

$$d_E^2(s) = f(s_4) + f_2(s_4) + f_2(s_4,s_3) + f_3(s_4,s_3,s_2) + f_4(s_4,s_3,s_2,s_1),$$

where $f_i(\bullet) \geq 0$.

Thus for sphere decoding with a radius $\sqrt{\eta}$ and starting with hypothesizing $s_4$, if the partial squared Euclidean distance corresponding to a hypothesized symbol value for $s_4$ is greater than the square of the radius, $f_1(s_4) > \eta$, then any combination of such a hypothesized symbol value for $s_4$ with any other hypothesized symbol values for $s_1$, $s_2$, and $s_3$ will have a signal vector fall outside of the desired radius. As a result, these hypotheses can be discarded early on, and the decoding complexity can be significantly reduced.

Figure 2:
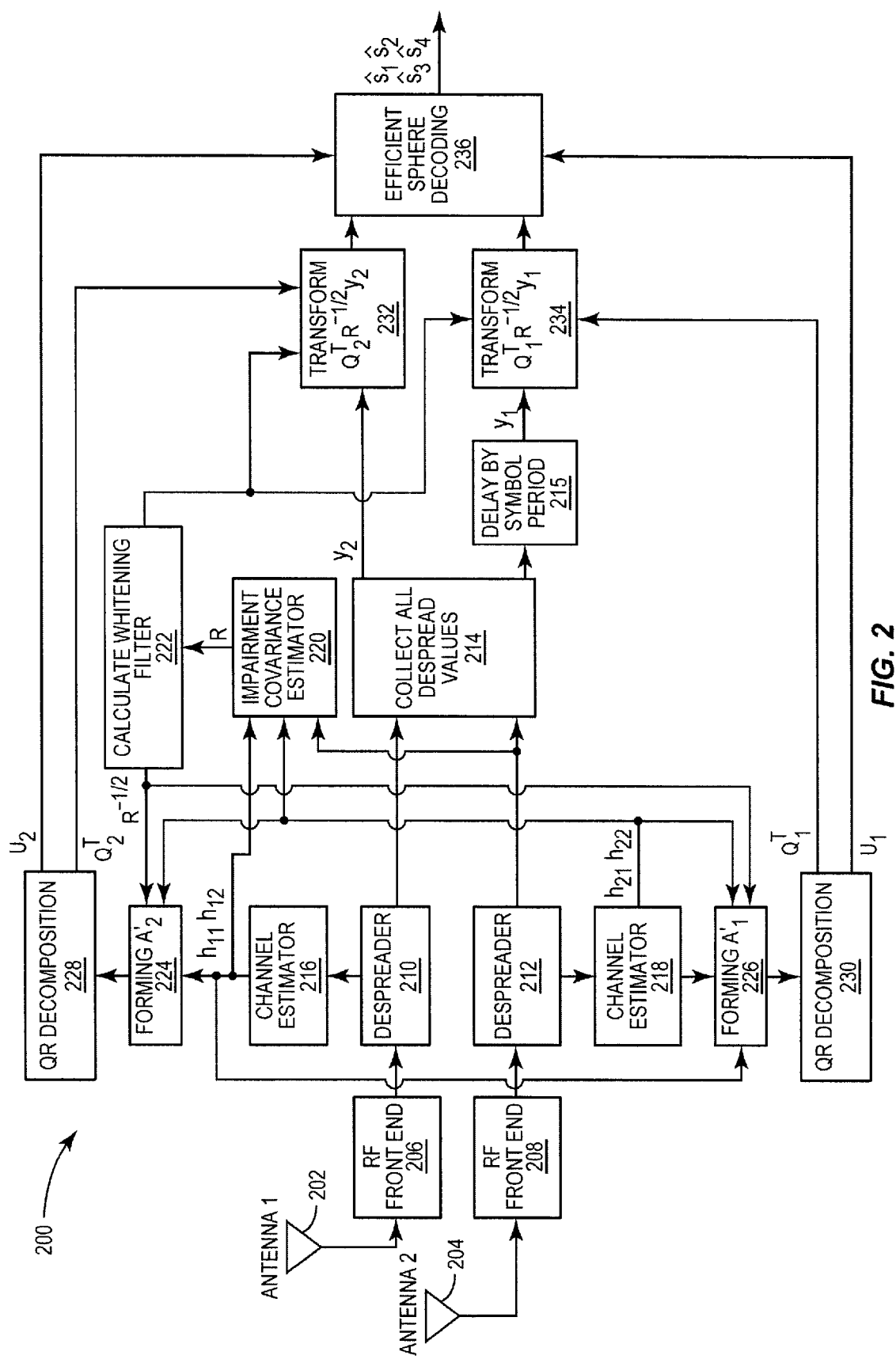
FIG. 2 is a functional block diagram of a CDMA Golden code receiver adapted to perform sphere decoding.

FIG. 2 depicts a functional block diagram of an exemplary 2×2 MIMO Golden code CDMA receiver 200 adapted to perform sphere decoding. Signals are received at two receive antennas 202, 204, and are processed by RF front end processors 206, 208 to generate baseband receive samples. Despreader units 210, 212 despread the received baseband signals. Each despreader unit 210, 212 consists of multiple Rake fingers whose finger delays are determined based on a finger placement controller (not shown). The despread values (i.e., the Rake finger outputs) associated with the data channels from the two received signals during one symbol interval are then collected into a vector (vector $y_j$ in the derivations) at collection module 214.

Meanwhile, the despread values associated with the pilot channel (or pilot symbols) are provided to channel estimators 216, 218 to produce estimated net responses $h_{1,1}$, $h_{2,1}$, $h_{1,2}$, $h_{2,2}$, which forms vectors $h_1$ and $h_2$ in the derivations, $h_j = (h_{1,j}^T h_{2,j}^T)^T$. Impairment covariance estimator 220 produces an impairment covariance estimate and filter module 222 calculates whitening filter coefficients. Based on the whitening coefficients and net responses, matrices $A'_1$ and $A'_2$ are formed in matrix formation modules 226, 224, respectively. QR decomposition modules 230, 228 perform QR decompositions on $A'_1$ and $A'_2$, respectively. The unitary matrices from the QR decompositions, and the whitening filter are provided to transform modules 234, 232 to transform the despread vectors $y_1$ and $y_2$ over two symbol intervals (delaying data vectors in delay module 215). The transformed despread vectors and the upper triangular matrices from the QR decompositions are provided to decoder 236 to perform efficient sphere decoding.

Those of skill in the art will recognize that one or more of the functional blocks depicted in FIGS. 1 and 2 may comprise analog or digital electronic circuits, or alternatively may comprise software modules executed on a processor or Digital Signal Processor, or alternatively may comprise any combination of hardware, software, and/or firmware.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of receiving Golden encoded CDMA wireless communication signals, comprising:
    receiving, at two receive antennas, signals comprising Golden encoded symbols transmitted from first and second transmit antennas;
    despreading the received signals to produce despread values in first and second symbol periods;
    formulating combining weights based on impairment correlation across G-Rake fingers and channel coefficients corresponding to the first transmit antenna and the second transmit antenna;
    producing a first set of combined values using the combining weights determined by impairment correlation and channel coefficients corresponding to the first transmit antenna to combine the despread values from the first symbol period to produce a first combined value and to combine the despread values from the second symbol period to produce a second combined value;
    producing a second set of combined values using the combining weights determined by impairment correlation and channel coefficients corresponding to the second transmit antenna to combine the despread values from the first symbol period to produce a third combined value and to combine the despread values from the second symbol period to produce a fourth combined value;
    processing the first, second, third, and fourth combined values using coefficients derived from the Golden number to generate a set of decision variables; and
    jointly detecting the Golden encoded symbols from the set of decision variables.

2. The method of claim 1 wherein jointly detecting the Golden encoded symbols from the set of decision variables comprises performing maximum likelihood detection on the set of decision variables.

3. The method of claim 2 wherein performing maximum likelihood detection comprises solving the equation $$LL(s) = 2Re\left\{\frac{s_1^*}{\sqrt{5}}[(1+i\overline{\theta})^* z_{1,1} + (1+i\theta)^* z_{2,2}]\right\} +$$

$$2Re\left\{\frac{s_2^*}{\sqrt{5}}[(\theta - i)^* z_{1,1} + (\overline{\theta} - i)^* z_{2,2}]\right\} +$$

$$2Re\left\{\frac{s_3^*}{\sqrt{5}}[(i - \theta)^* z_{2,1} + (1+i\overline{\theta})^* z_{1,2}]\right\} +$$

$$2Re\left\{\frac{s_4^*}{\sqrt{5}}[(1+i\overline{\theta})^* z_{2,1} + (\theta - i)^* z_{1,2}]\right\} -$$

$$\sum_{m=1}^{4} |s_m|^2 d_{m,m} - \sum_{m=1}^{4}\sum_{n=1}^{4} 2Re\{s_m^* s_n d_{m,n}\}$$

where $w_j = R^{-1} h_j$, R is a matrix of impairment correlations across G-Rake fingers and the net response is $h_j = (h_{1,j}^T, h_{2,j}^T)^T$, G-Rake combined data values are given by $z_{j,k} = w_j^H y_k$, where w is a vector of G-Rake combining weights and y is a vector of despread values, the mathematical quantities $$d_{1,1} = d_{3,3} = \frac{1}{\sqrt{5}}[-\overline{\theta}\gamma_{1,1} + \theta\gamma_{2,2}],$$

$$d_{2,2} = d_{4,4} = \frac{1}{\sqrt{5}}[\theta\gamma_{1,1} - \overline{\theta}\gamma_{2,2}],$$

$$d_{1,2} = d_{3,4} = \frac{1}{\sqrt{5}}[\gamma_{1,1} - \gamma_{2,2}],$$

$$d_{2,4} = -d_{1,3} = \frac{1}{\sqrt{5}}[\gamma_{1,2} + i\gamma_{2,1}],$$

-continued $$d_{1,4} = \frac{1}{\sqrt{5}}[-\bar{\theta}\gamma_{1,2} - i\theta\gamma_{2,1}],$$

$$d_{2,3} = \frac{1}{\sqrt{5}}[-\theta\gamma_{1,2} - i\bar{\theta}\gamma_{2,1}],$$

where
G-Rake combined channel values are given by $\gamma_{j,k}=h_j^H R^{-1} h_k = w_j^H h_k$,
s are symbol values, and
$i=\sqrt{-1}$, $$\theta = \frac{1+\sqrt{5}}{2}$$

is the Golden number, and
$\bar{\theta}=1-\theta$.

4. The method of claim 1 further comprising performing sphere decoding to jointly detect the Golden encoded symbols.

5. The method of claim 4 further comprising whitening a noise component in the despread values.

6. The method of claim 5 further comprising performing QR decomposition on matrices of whitening coefficients and channel coefficients.

7. The method of claim 6 further comprising
calculating the squared Euclidean distance between the received signal and a hypothesized Golden encoded symbol combination.

8. The method of claim 7 wherein calculating the squared Euclidean distance between the received signal and a hypothesized Golden encoded symbol combination comprises calculating partial squared Euclidean distance as a function of a subset of the symbols in the hypothesized Golden encoded symbol combination.

9. The method of claim 8 wherein the subset contains only one symbol in the hypothesized Golden encoded symbol combination.

10. The method of claim 7 further comprising comparing a partial squared Euclidean distance corresponding to a subset of the symbols in the hypothesized Golden encoded symbol combination with a radius, and discarding any hypothesized Golden encoded symbol combinations containing the hypothesized symbol values in the subset.

11. A CDMA receiver adapted to decode Golden encoded symbols, comprising:
at least first and second receiver antennas, each receiving signals comprising Golden encoded symbols transmitted from at least two transmit antennas;
despreader modules corresponding to the receiver antennas, each operative to despread the received signals over one symbol period to produce a plurality of despread values;
a combining weight formulation module operative to generate G-Rake combining weights based on impairment correlation across G-Rake fingers and channel coefficients corresponding to each transmit antenna;
a combining module operative to combine despread values from each symbol period over a plurality of symbol periods based on the combining weights; and
a decoder operative to process the combined values using coefficients derived from the Golden number to generate a set of decision variables, and further operative to jointly detect the Golden encoded symbols from the decision variables performing sphere decoding; and
wherein the detector is operative to perform maximum likelihood detection of Golden encoded data symbols by solving the equation $$LL(s) = 2Re\left\{\frac{s_1^*}{\sqrt{5}}[(1+i\bar{\theta})^*z_{1,1} + (1+i\theta)^*z_{2,2}]\right\} +$$

$$2Re\left\{\frac{s_2^*}{\sqrt{5}}[(\theta-i)^*z_{1,1} + (\bar{\theta}-i)^*z_{2,2}]\right\} +$$

$$2Re\left\{\frac{s_3^*}{\sqrt{5}}[(i-\theta)^*z_{2,1} + (1+i\bar{\theta})^*z_{1,2}]\right\} +$$

$$2Re\left\{\frac{s_4^*}{\sqrt{5}}[(1+i\bar{\theta})^*z_{2,1} + (\theta-i)^*z_{1,2}]\right\} -$$

$$\sum_{m=1}^{4}|s_m|^2 d_{m,m} - \sum_{m=1}^{4}\sum_{n=1}^{4} 2Re\{s_m^* s_n d_{m,n}\}$$

where $w_j=R^{-1}h_j$, R is a matrix of impairment correlations across G-Rake fingers and the net response is $h_j=(h_{1,j}^T, h_{2,j}^T)^T$,
G-Rake combined data values are given by $z_{j,k}=w_j^H y_k$,
where w is a vector of G-Rake combining weights and y is a vector of despread values,
the mathematical quantities $$d_{1,1} = d_{3,3} = \frac{1}{\sqrt{5}}[-\bar{\theta}\gamma_{1,1} + \theta\gamma_{2,2}],$$

$$d_{2,2} = d_{4,4} = \frac{1}{\sqrt{5}}[\theta\gamma_{1,1} - \bar{\theta}\gamma_{2,2}],$$

$$d_{1,2} = d_{3,4} = \frac{1}{\sqrt{5}}[\gamma_{1,1} - \gamma_{2,2}],$$

$$d_{2,4} = -d_{1,3} = \frac{1}{\sqrt{5}}[\gamma_{1,2} + i\gamma_{2,1}],$$

$$d_{1,4} = \frac{1}{\sqrt{5}}[-\bar{\theta}\gamma_{1,2} - i\theta\gamma_{2,1}],$$

$$d_{2,3} = \frac{1}{\sqrt{5}}[-\theta\gamma_{1,2} - i\bar{\theta}\gamma_{2,1}],$$

where
G-Rake combined channel values are given by $\gamma_{j,k}=h_j^H R^{-1} h_k = w_j^H h_k$,
s are symbol values, and
$i=\sqrt{-1}$, $$\theta = \frac{1+\sqrt{5}}{2}$$

is the Golden number, and
$\bar{\theta}=1-\theta$.

12. A CDMA receiver adapted to receive and sphere decode Golden encoded symbols, comprising:
at least first and second receiver antennas, each receiving signals comprising Golden encoded symbols transmitted from at least two transmit antennas;
corresponding front end processors connected to the receiver antennas and operative to generate baseband received samples;

a collection module connected to the despreader units and operative to collect despread vectors;

corresponding despreader units connected to the front end processors and operative to generate corresponding vectors of despread values over one symbol interval;

a delay unit connected to the collection module and operative to delay despread vectors for one or more symbol periods;

channel estimators corresponding to the receiver antennas connected to the despreader units and operative to generate vectors of channel responses for each transmit antenna over one symbol interval;

a covariance estimator connected to the despreader units and operative to estimate an impairment covariance matrix;

a whitening filter connected to the covariance estimator and operative to calculate whitening filter coefficients;

matrix forming modules corresponding to the receiver antennas, each connected to the channel estimators associated with all other receiver antennas and the whitening filter, each operative to calculate a channel characterization matrix;

QR decomposition modules corresponding to the receiver antennas connected to the matrix forming modules and operative to generate unitary matrices by QR decomposing the channel characterization matrices;

transform modules corresponding to the receiver antennas connected to the QR decomposition modules, the whitening filter, and the collection module or a delay unit, the transform modules operative to transform the despread vectors over a plurality of symbol intervals; and a sphere decoder connected to the transform modules and the QR decomposition modules and operative to jointly sphere decode Golden encoded data symbols.

* * * * *

UNITED STATES PATENT AND TRADEMARK OFFICE
CERTIFICATE OF CORRECTION

PATENT NO. : 8,018,985 B2
APPLICATION NO. : 12/056035
DATED : September 13, 2011
INVENTOR(S) : Khayrallah et al.

It is certified that error appears in the above-identified patent and that said Letters Patent is hereby corrected as shown below:

In Column 4, Lines 23-24, delete "$E[u_2^H]$," and insert -- $E[u_2 u_2^H]$, --, therefor.

In Column 6, Line 11, delete "$z_{1,1}$," and insert -- $z_{1,2}$, --, therefor.

In Column 6, Line 61, delete "$\tilde{y}_1 = Q_1^H y'_j = U_1 s + \tilde{u}_1$," and insert -- $\tilde{y}_1 = Q_1^H y'_1 = U_1 s + \tilde{u}_1$ --, therefor.

In Column 6, Line 66, delete "$d_E^2(s) = |\tilde{y}_1 - U_1 s|^2 |\tilde{y}_2 - U_2 s|^2$," and insert -- $d_E^2(s) = |\tilde{y}_1 - U_1 s|^2 + |\tilde{y}_2 - U_2 s|^2$ --, therefor.

In Column 7, Line 6, delete "$d_E^2(s) = f(s_4) + f_2(s_4, s_3) + f_3(s_4, s_3, s_2) + f_4(s_4, s_3, s_2, s_1)$," and insert -- $d_E^2(s) = f_1(s_4) + f_2(s_4, s_3) + f_3(s_4, s_3, s_2) + f_4(s_4, s_3, s_2, s_1)$, --, therefor.

In Column 7, Lines 33-34, delete "$h_j = (h_{1,j}^T h_{2,j}^T)^T$," and insert -- $h_j = (h_{1,j}^T, h_{2,j}^T)^T$ --, therefor.

In Column 9, Lines 10-11, in Claim 3, delete "$\gamma_{j,k} = hj^H R^{-1}_1 h_k = w_j^H h_k$," and insert -- $\gamma_{j,k} = h_j^H R^{-1} h_k = w_j^H h_k$, --, therefor.

In Column 10, Lines 48-49, in Claim 11, delete "$\gamma_{j,k} = h_j^H R^{-1}_1 h_k = w_j^H h_k$," and insert -- $\gamma_{j,k} = h_j^H R^{-1} h_k = w_j^H h_k$, --, therefor.

Signed and Sealed this
Fourteenth Day of February, 2012

David J. Kappos
*Director of the United States Patent and Trademark Office*